(12) United States Patent
Lang et al.

(10) Patent No.: US 11,700,177 B2
(45) Date of Patent: *Jul. 11, 2023

(54) CLOUD COMPUTING INFRASTRUCTURE PIPELINES WITH RUN TRIGGERS

(71) Applicant: HashiCorp, San Francisco, CA (US)

(72) Inventors: Casey Lang, Austin, TX (US); Krista LaFentres, Kansas City, MO (US); Jon Schulman, Vacaville, CA (US)

(73) Assignee: HashiCorp Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,502

(22) Filed: Jan. 10, 2022

(65) Prior Publication Data
US 2022/0131743 A1    Apr. 28, 2022

Related U.S. Application Data

(63) Continuation of application No. 16/925,228, filed on Jul. 9, 2020, now Pat. No. 11,223,526.

(51) Int. Cl.
*G06F 15/16*    (2006.01)
*H04L 41/082*    (2022.01)
(Continued)

(52) U.S. Cl.
CPC ........ *H04L 41/082* (2013.01); *H04L 41/0806* (2013.01); *H04L 41/0866* (2013.01);
(Continued)

(58) Field of Classification Search
CPC ... H04L 41/082; H04L 41/0869; H04L 41/22; H04L 41/0866; H04L 41/0895; H04L 41/0806
See application file for complete search history.

(56) References Cited

U.S. PATENT DOCUMENTS

2015/0237128 A1\* 8/2015 Castro ................. H04L 63/0876
726/4
2016/0162478 A1\* 6/2016 Blassin .......... G06Q 10/063112
706/12
(Continued)

OTHER PUBLICATIONS

Non-Final Office Action dated May 11, 2021 for U.S. Appl. No. 16/925,228, 13 pages.
(Continued)

*Primary Examiner* — Richard G Keehn
(74) *Attorney, Agent, or Firm* — FisherBroyles LLP; James P. Cleary

(57) ABSTRACT

Systems and methods of managing information technology infrastructure are described. A method includes identifying a run trigger between a first node and a second node, each node maintaining a configuration for a portion of a cloud computing infrastructure associated with executing a portion of a cloud-based application. The run trigger initiates in response to an action at the first node and comprises a source identifier identifying the first node and a destination identifier identifying the second node. Then a run is queued on the second node based on the run trigger, the run including a process executed on the second portion of the cloud computing infrastructure with data received by the second node and associated with a run source identifier. The run on the second node is then planned and executed, causing the cloud computing infrastructure to modify infrastructure resources associated with the second portion of the cloud computing infrastructure.

20 Claims, 8 Drawing Sheets

(51) Int. Cl.
*H04L 41/0869* (2022.01)
*H04L 41/0806* (2022.01)
*H04L 41/0866* (2022.01)
*H04L 41/0895* (2022.01)
*H04L 41/22* (2022.01)

(52) U.S. Cl.
CPC ...... *H04L 41/0869* (2013.01); *H04L 41/0895* (2022.05); *H04L 41/22* (2013.01)

(56) References Cited

U.S. PATENT DOCUMENTS

| | | | |
|---|---|---|---|
| 2017/0289059 A1* | 10/2017 | Wu | H04L 47/70 |
| 2020/0244699 A1* | 7/2020 | Hutchinson | H04L 41/40 |
| 2020/0259861 A1* | 8/2020 | Margel | H04L 63/1416 |

OTHER PUBLICATIONS

Notice of Allowance dated Aug. 24, 2021 for U.S. Appl. No. 16/925,228, 8 pages.

* cited by examiner

```
⊘ Plan finished a month ago        710                                Resources: 1 to add, 0 to change, 1 to destroy    ⌃

Started a month ago > Finished a month ago

┌─────────────┐     ┌──────┬─────────┬──────────┬─────────────┐
│ View raw log│     │ ↑ Top│ ↓ Bottom│ ✥ Expand │ ⤢ Full screen│
└─────────────┘     └──────┴─────────┴──────────┴─────────────┘

Terraform will perform the following actions:

# random_id.random must be replaced
-/+ resource "random_id" "random" {
    ~ b64        = "OugvNIXFwxH_eW7PaTS0Fd7ZeHaWONuQyco" -> (known after apply)
    ~ b64_std    = "OugvNIXFwxH/eW7PaTS0Fd7ZeHaWONuQyco==" -> (known after apply)
    ~ b64_url    = "OugvNIXFwxH_eW7PaTS0Fd7ZeHaWONuQyco" -> (known after apply)
      byte_length = 26
    ~ dec        = "94659851810541623317772653119352541948783575919524199382419..." -> (known after apply)    720
    ~ hex        = "3ae62f3655c5c171ff796ec6934b415ded978763639db90c9ca" -> (known after apply)
    ~ id         = "OugvNIXFwxH_eW7PaTS0Fd7ZeHaWONuQyco" -> (known after apply)
    ~ keepers    = {
        ~ "uuid" = "cea41462-bc9b-63b4-ddc2-e122ae022626"
      } -> (known after apply) # forces replacement
    }

Plan: 1 to add, 0 to change, 1 to destroy.

Runs will automatically be queued in the following workspaces:
terraform-multi-random
terraform-random-integer         730
terraform-random-pet
```

FIG. 7

CLOUD COMPUTING INFRASTRUCTURE PIPELINES WITH RUN TRIGGERS

CROSS-REFERENCES TO RELATED APPLICATIONS

The current application is a continuation of U.S. Non-Provisional patent application Ser. No. 16/925,228, filed on Jul. 9, 2020, entitled "CLOUD COMPUTING INFRASTRUCTURE PIPELINES WITH RUN TRIGGERS", which is incorporated by reference herein in its entirety.

TECHNICAL FIELD

The present disclosure generally relates to information technology infrastructure and, more specifically, to lifecycle management for interconnected nodes of information technology infrastructure including the provisioning, modification, and/or de-provisioning of the underlying resources.

BACKGROUND

Information technology (IT) infrastructure may refer to the hardware resources, software resources, and/or network resources forming an enterprise's information technology environment. For example, hardware resources may include servers, computers, data centers, switches, hubs, routers, and/or the like. Meanwhile, software resources may include enterprise resource planning (ERP) software applications, customer relationship management (CRM) software applications, productivity software applications, and/or the like. The network resources of the enterprise's information technology infrastructure may include any resources providing network enablement, network connectivity, network security, and/or the like.

The information technology infrastructure of the enterprise may enable the delivery of information technology services and/or solutions to a variety of internal and external users including, for example, employees, partners, customers, and/or the like. For instance, the hardware resources of the enterprise's information technology infrastructure may be used to host the software resources. At least some of the software resources within the enterprise's information technology infrastructure may be available remotely, for example, as a software-as-a-service (SaaS), a web application, and/or the like. Remote access to these software resources may be enabled and/or regulated by the network resources within the enterprise's information technology infrastructure.

Within an organization, there may be many people working on the same project, such as a cloud-computing application, each working independently on different portions of the project. A particular project may be divided into workspaces. A workspace may be the combination of a configuration file, describing rules for the information technology infrastructure, and values, serving as the inputs for the configuration file. The workspace also includes the state of the information technology infrastructure. Additionally, a project can be divided into modules. A module encapsulates sets of related configuration data, allowing them to be abstracted and reused, such as by multiple workspaces. An IT infrastructure pipeline can refer to a system of interconnected modules and workspaces that together define the information technology infrastructure of a cloud-based application.

Subgroups of an organization may not all have access to the same documents, workspaces, or modules and may not be aware of what is being done on other teams or in other parts of the organization. However, these disparate parts of the organization can still be linked and share infrastructure needs. Therefore, a change made by one team can affect a plurality of others. Requiring all parts of the organization to monitor for and/or communicate about each and update made may be cumbersome and require significant time and computer resources. Additionally, one part of the organization may not have access to other workspaces, for security or other reasons, and thus may not be able to determine when changes have been made that affect them until negative effects of the change occur.

BRIEF SUMMARY

This document describes run triggers, which can connect nodes of a cloud computing IT infrastructure pipeline. Run triggers can provide linkages that allow downstream nodes to update automatically in response to IT infrastructure changes made upstream in the pipeline. A pipeline may comprise a series of interconnected nodes representing the configuration of a cloud-based application. The IT infrastructure pipeline may be represented as a non-linear graph, with edges representing run triggers providing upstream and downstream linkages between nodes.

In some implementations of the current subject matter, there is provided a computer-implemented method. The method may include: identifying a run trigger between a first node and a second node, the first node maintaining configuration for a first portion of a cloud computing infrastructure associated with executing a first portion of a cloud-based application on the cloud computing infrastructure, the second node maintaining configuration for a second portion of the cloud computing infrastructure associated with executing a second portion of the cloud-based application on the cloud computing infrastructure, the run trigger initiating in response to an action at the first node and comprising a source identifier and a destination identifier, wherein the source identifier is an identifier of the first node and the destination identifier is an identifier of the second node; queuing a run on the second node based on the run trigger, the run including a process executed on the second portion of the cloud computing infrastructure with data received and at least temporarily stored by the second node and associated with a run source identifier; planning the run on the second node; and executing the run on the second node, wherein the run causes the cloud computing infrastructure to modify one or more infrastructure resources associated with the second portion of the cloud computing infrastructure.

In some variations, one or more features disclosed herein including the following features may be optionally included in any feasible configuration. In some variations, the first node is a workspace, the run is a second run, the process is a second process, and the method further comprises: before identifying the run trigger, planning a first run on the first node, the first run including a first process executed on the first portion of the cloud computing infrastructure with data at least temporarily stored on the first node and associated with the run source identifier, wherein the first run comprises the action; and before planning the second run, executing the first run on the first node, wherein the first run causes the cloud computing infrastructure to modify one or more infrastructure resources associated with the first portion of the cloud computing infrastructure, wherein the first run generates a state file that is an input to the second run, the state file listing the one or more infrastructure resources in use after the first run.

In some variations, the first node is a module, and the method further comprises: before identifying the run trigger, modifying the first node in a module registry, the module registry comprising a database of a plurality of modules, wherein the modification comprises the action.

In some variations, before identifying the run trigger, the method further comprises: creating the run trigger between the first node and the second node. Creating the run trigger further comprises: determining that the run trigger does not form a loop. Determining that the run trigger does not form a loop comprises: identifying one or more descendants of the second node, wherein each descendant of the one or more descendants is a node connected by a subsequent run trigger to the second node or a descendant of the second node; and determining that the identifiers of the one or more descendants of the second node do not include the identifier of the first node. Executing the run on the second node further comprises: identifying one or more additional runs on the second node, each of the one or more additional runs associated with an additional run source identifier; comparing the run source identifier of the run to the additional run source identifiers; and aborting the run if the run source identifier matches at least one of the additional run source identifiers. In some variations identifying the run trigger comprises: querying a run trigger database with the source identifier; and receiving the destination identifier from the run trigger database. In some variations, the second node is a workspace. Executing the run occurs directly after planning the run.

In another aspect, there may be provided a system. The system can include at least one data processor. The system can also include at least one memory storing instructions which, when executed by the at least one data processor, result in operations comprising: identifying a run trigger between a first node and a second node, the first node maintaining configuration for a first portion of a cloud computing infrastructure associated with executing a first portion of a cloud-based application on the cloud computing infrastructure, the second node maintaining configuration for a second portion of the cloud computing infrastructure associated with executing a second portion of the cloud-based application on the cloud computing infrastructure, the run trigger initiating in response to an action at the first node and comprising a source identifier and a destination identifier, wherein the source identifier is an identifier of the first node and the destination identifier is an identifier of the second node; queuing a run on the second node based on the run trigger, the run including a process executed on the second portion of the cloud computing infrastructure with data received and at least temporarily stored by the second node and associated with a run source identifier; planning the run on the second node; and executing the run on the second node, wherein the run causes the cloud computing infrastructure to modify one or more infrastructure resources associated with the second portion of the cloud computing infrastructure.

In some variations, the first node is a workspace, the run is a second run, the process is a second process, and the operations further comprise: before identifying the run trigger, planning a first run on the first node, the first run including a first process executed on the first portion of the cloud computing infrastructure with data at least temporarily stored on the first node and associated with the run source identifier, wherein the first run comprises the action; and before planning the second run, executing the first run on the first node, wherein the first run causes the cloud computing infrastructure to modify one or more infrastructure resources associated with the first portion of the cloud computing infrastructure, wherein the first run generates a state file that is an input to the second run, the state file listing the one or more infrastructure resources in use after the first run.

In some variations, the first node is a module, and the operations further comprise: before identifying the run trigger, modifying the first node in a module registry, the module registry comprising a database of a plurality of modules, wherein the modification comprises the action.

In some variations, before identifying the run trigger, the operations further comprise: creating the run trigger between the first node and the second node. Creating the run trigger further comprises: determining that the run trigger does not form a loop. Determining that the run trigger does not form a loop comprises: identifying one or more descendants of the second node, wherein each descendant of the one or more descendants is a node connected by a subsequent run trigger to the second node or a descendant of the second node; and determining that the identifiers of the one or more descendants of the second node do not include the identifier of the first node. Executing the run on the second node further comprises: identifying one or more additional runs on the second node, each of the one or more additional runs associated with an additional run source identifier; comparing the run source identifier of the run to the additional run source identifiers; and aborting the run if the run source identifier matches at least one of the additional run source identifiers.

In some variations identifying the run trigger comprises: querying a run trigger database with the source identifier; and receiving the destination identifier from the run trigger database. In some variations, the first node is a first workspace. In some variations, the second node is a second workspace. Executing the second run occurs directly after planning the second run.

In another aspect, there is provided a non-transitory computer readable medium storing instructions. The instructions may be executed by at least one data processor to result in operations. The operations may include: identifying a run trigger between a first node and a second node, the first node maintaining configuration for a first portion of a cloud computing infrastructure associated with a first portion of a cloud-based application on the cloud computing infrastructure, the second node maintaining configuration for a second portion of the cloud computing infrastructure associated with executing a second portion of the cloud-based application on the cloud computing infrastructure, the run trigger initiating in response to an action at the first node and comprising a source identifier and a destination identifier, wherein the source identifier is an identifier of the first node and the destination identifier is an identifier of the second node; queuing a run on the second node based on the run trigger, the run including a process executed on the second portion of the cloud computing infrastructure with data received and at least temporarily stored by the second node and associated with the run source identifier; planning the run on the second node; and executing the run on the second node, wherein the run causes the cloud computing infrastructure to modify one or more infrastructure resources associated with the second portion of the cloud computing infrastructure.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the management of information technology infrastructure, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 depicts an example of a user interface with a plan for a run trigger, in accordance with some example embodiments.

Figure 1:
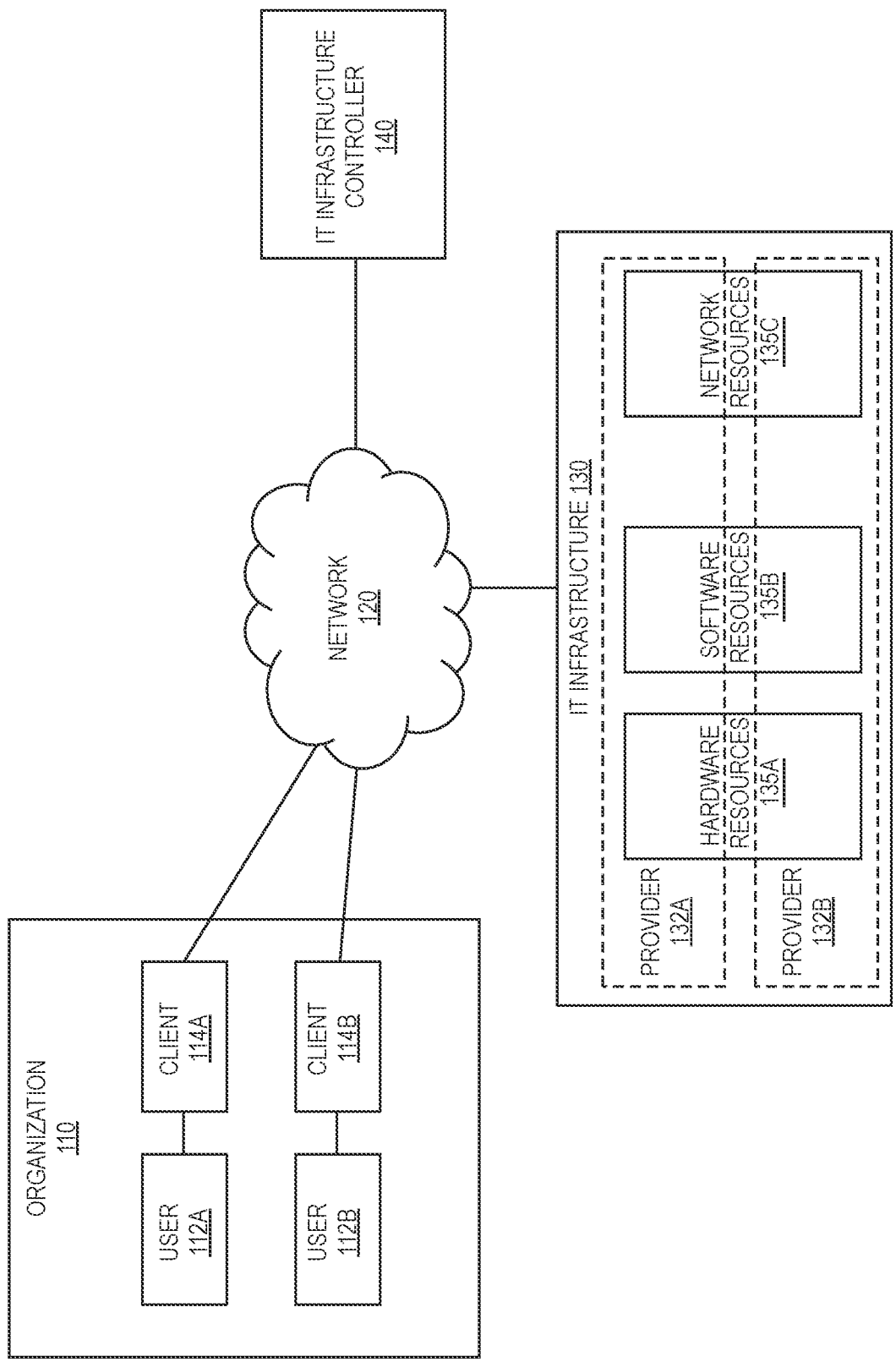
FIG. 1 depicts a system diagram of an IT infrastructure management system, in accordance with some example embodiments.

When practical, like labels are used to refer to same or similar items in the drawings.

DETAILED DESCRIPTION

Embodiments establish connections, called run triggers, between two workspaces of a cloud computing infrastructure platform. The run trigger can allow the results of one node (such as a workspace or module) to affect downstream workspaces that may depend on the infrastructure of the first workspace. For example, one workspace in one part of an IT infrastructure pipeline may determine the number of servers that are used to execute a first part of a program. When a run is executed on the first workspace, an execution plan can be created that identifier the servers to use. When the execution plan is applied, servers can added and removed from the IT infrastructure as appropriate. A second workspace, further down the IT infrastructure pipeline, may use the same servers that were determined by the first workspace to execute a second part of the program. Therefore, the second workspace will want to know about changes that the first workspace made to the infrastructure to avoid, for example, attempting to access a server that is no longer connected. Accordingly, there may be a desire to accomplish this without users of the second workspace manually monitoring whether the first workspace is edited in a significant way, and without the first workspace being made accessible to other users that are not granted access to it.

Run triggers address these and other problems. A run trigger can be a rule executed by an IT infrastructure controller that establishes a connection between two workspaces and/or modules that have some dependency. A run can be executed on the first workspace, executing a configuration profile that describes the infrastructure needs of the first workspace. The first workspace run then goes to a planning stage, where an execution plan can be generated that describes changes to be made to the IT infrastructure. When the first workspace run is in the planning stage, an IT infrastructure controller that monitors the infrastructure changes can detect that a run trigger exists between the first workspace and a second workspace. After determining that the run trigger will not lead to errors (e.g., the run trigger does not form an infinite loop of connected workspaces), the IT infrastructure controller can queue a run of the second workspace in response to the run trigger. When the run executing in the first workspace completes, the run executing in the second workspace can begin. The second workspace can retrieve any necessary updated values output by the first workspace and use them as inputs for its own run, effectively updating the second workspace in response to changes made in the first workspace. The second workspace may be connected to one or more workspaces by additional run triggers, allowing the changes to be propagated to an arbitrary number of workspaces within a pipeline.

FIG. 1 depicts a system diagram illustrating an information technology (IT) infrastructure management system 100, in accordance with some example embodiments. Referring to FIG. 1, the information technology infrastructure management system 100 may include an information technology infrastructure controller 140, a first client 114a, and a second client 114b. Furthermore, the information technology infrastructure management system 100 may include one or more information technology infrastructures including, for example, an information technology infrastructure 130 and/or or the like. As FIG. 1 shows, the IT infrastructure controller 140, the first client 114a, the second client 114b, and/or the information technology infrastructure 130 may be communicatively coupled via a network 120. The network 120 may be any wired and/or wireless network including, for example, a local area network (LAN), a wide area network (WAN), a public land mobile network (PLMN), the Internet, and/or the like.

Referring again to FIG. 1, the information technology infrastructure 130 may include a plurality of resources from one or more different providers including, for example, physical equipment, virtual machines, and/or the like. To further illustrate, FIG. 1 shows the information technology infrastructure 120 as including, for example, hardware resources 135a, software resources 135b, network resources 135c, and/or the like. Moreover, FIG. 1A shows that the information technology infrastructure 130 may include resources from multiple providers including, for example, a first provider 132a, a second provider 132b, and/or the like. For example, at least one of the first provider 132a and the second provider 132b may be a private provider such that at least a portion of the hardware resources 135a, the software resources 135b, and/or the network resources 135c are private resources owned and operated by an enterprise for exclusive use by the enterprise. Alternatively and/or additionally, at least one of the first provider 132a and/or the second provider 132b may be a third party provider including, for example, an infrastructure-as-a-service (IaaS) provider, a platform-as-a-service (PaaS) provider, a software-as-a-service (SaaS) provider, and/or the like. As such, at least a portion of the hardware resources 135a, the software resources 135b, and/or the network resources 135c may be public resources shared amongst multiple enterprises.

In some example embodiments, the IT infrastructure controller 140 may provision, modify, and/or de-provision one or more resources in the information technology infrastructure 130 as part of configuring the information technology infrastructure 130 to host the software application and/or to ensure that the performance of the software application meets a threshold metric (e.g., a service level objective (SLO) and/or the like). However, it should be appreciated that the information technology infrastructure 130 may be configured and/or reconfigured to achieve any information technology objective including, for example, support for multi-tier software applications, self-service clusters, software demonstrations, disposable environments (e.g., production environments, staging environments, and/or the like), software defined networking, resource schedulers, multi-cloud deployment, and/or the like.

In some example embodiments, at least a portion of the information technology infrastructure 130 may be configured using infrastructure as code (IaC). That is, instead of and/or in addition to physical hardware configuration, the information technology infrastructure 130 may be configured via software using, for example, one or more configuration files specifying the configurations to apply to the information technology infrastructure 130 as well as one or more corresponding variables. For instance, in order to support the deployment, testing, and/or maintenance of a software application at the information technology infrastructure 130, the information technology infrastructure 130 may be configured based on a first configuration file 125a and/or a second configuration file 125b created respectively, for example, by a first user 112a at the first client 114a and a second user 112b at the second client 114b. As shown in FIG. 1, the first user 112a at the first client 114a and the second user 112b at the second client 114b may be associated with a same organization, for example, an organization 110. However, it should be appreciated that the first user 112a at the first client 114a and the second user 112b at the second client 114b may be associated with different organizations.

The first configuration file 125a and the second configuration file 125b may each include a programming code-based representation of the hardware resources 135a, the software resources 135b, and/or the network resources 135c in the information technology infrastructure 130. For example, the first configuration file 125a and/or the second configuration file 125b may be rendered in a configuration language (e.g., HashiCorp Configuration Language (HCL) provided by HashiCorp, San Francisco, Calif.) and/or a data interchange language (e.g., JavaScript Object Notation (JSON)) that is human readable and editable as well as machine readable. Moreover, the first configuration file 125a and/or the second configuration file 125b may specify one or more configurations to apply to the information technology infrastructure 130 including, for example, the provisioning, modification, and/or de-provisioning of the hardware resources 135a, the software resources 135b, and/or the network resources 135c.

Figure 2:
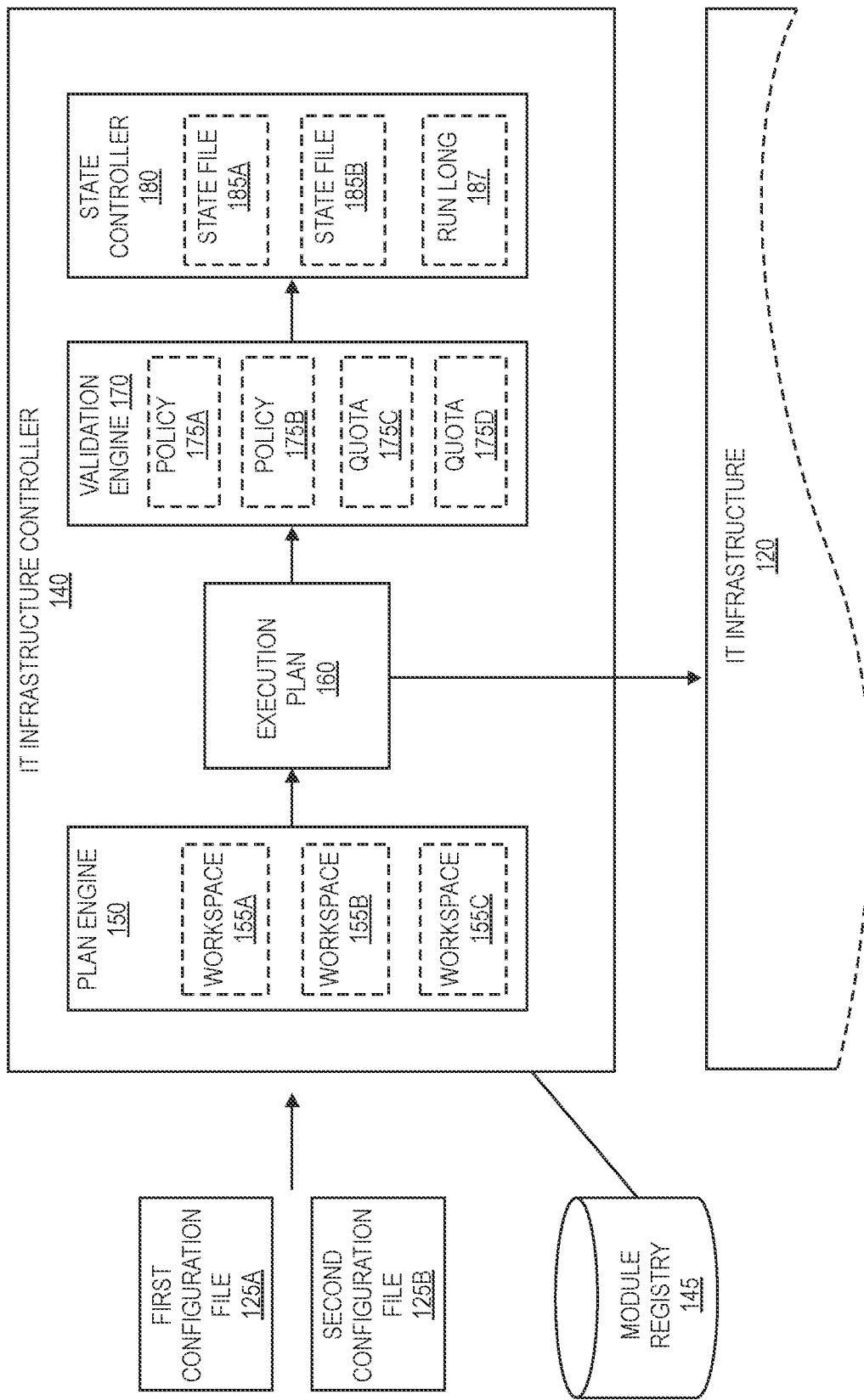
FIG. 2 depicts a block diagram of an IT infrastructure controller cloud computing platform, in accordance with some example embodiments.

FIG. 2 depicts a block diagram illustrating the IT infrastructure controller 140, in accordance with some example embodiments. Referring to FIGS. 1-2, the IT infrastructure controller 140 may include a plan engine 150, a validation engine 170, and a state controller 180. As shown in FIG. 2, in some example embodiments, the IT infrastructure controller 140 may be configured to generate an execution plan 160 for applying, to the information technology infrastructure 130, one or more configurations specified, for example, in the first configuration file 125a and/or the second configuration file 125b. The IT infrastructure controller 140 may also maintain or be in communication with a module registry 145.

Referring again to FIG. 2, the plan engine 150 may include one or more workspaces including, for example, a first workspace 155a, a second workspace 155b, and a third workspace 155c. Each of the first workspace 155a, the second workspace 155b, and the third workspace 155c may be configured to maintain the configurations for at least a portion of the information technology infrastructure 130. Alternatively, the first workspace 155a, the second workspace 155b, and/or the third workspace 155c may be configured to maintain configurations for different information technology infrastructures, each of which associated with a different organization.

In some example embodiments, the first workspace 155a, the second workspace 155b, and the third workspace 155c may each maintain a different iteration of configurations for at least a portion of the information technology infrastructure 130. For example, the first workspace 155a, the second workspace 155b, and the third workspace 155c may each maintain the configurations that are applied to the information technology infrastructure 130 in order to configure the information technology infrastructure 130 to support a production environment, a staging environment, and a development environment for a software application. Accordingly, the first workspace 155a may maintain the configurations associated with a production environment, the second workspace 155b may maintain the configurations associated with a staging environment, and the third workspace 155c may maintain the configurations associated with a development environment.

Alternatively and/or additionally, each of the first workspace 155a, the second workspace 155b, and the third workspace 155c may be associated with the configurations for a specific portion the information technology infrastructure 130. For examples, the first workspace 155a may maintain the configurations for to the hardware resources 135a of the information technology infrastructure 130, the second workspace 155b may maintain the configurations for the software resources 135b of the information technology infrastructure 130, and the third workspace 155c may maintain the configurations for the network resources 135c of the information technology infrastructure 130.

In some example embodiments, the first workspace 155a, the second workspace 155b, and the third workspace 155c may each be associated with a different set of variables. Each set of variables may correspond to a different iteration of configurations for the information technology infrastructure 130 (e.g., production environment, staging environment, development environment, and/or the like). Alternatively and/or additionally, each set of variables may correspond to the configurations for a different portion of the information technology infrastructure 130 (e.g., the hardware resources 135a, the software resources 135b, the network resources 135c, and/or the like). At least some of these variables may be set and/or modified by the merging of the first configuration file 125a and/or the second configuration file 125b into the first workspace 155a, the second workspace 155b, and the third workspace 155c.

The first workspace 155a, the second workspace 155b, and the third workspace 155c may be associated with one or more organizations including, for example, the organization 155. However, as noted, the first workspace 155a, the second workspace 155b, and the third workspace 155c may be associated with multiple organizations, each of which having a distinct information technology infrastructure. Moreover, the first workspace 155a, the second workspace 155b, and the third workspace 155c may each be associated with a team of one or more users from the organization 155. For example, the first workspace 155a may be associated with a first team of users that includes the first user 112a at the first client 114a while the second workspace 155b may be associated with a second team of users that includes the second user 112b at the second client 114b. Each team of users may be accorded exclusive access to the corresponding workspace. Moreover, different users within a team of users may afforded different access privileges with respect to a corresponding workspace. For example, the first user 112a may be provided read access, write access, and/or administrative access to the first workspace 155a while the second user 112b may be provided read access, write access, and/or administrative access to the second workspace 155b. However, the first user 112a may be prevented from accessing the second workspace 155b if the first user 112a is not a member of the second team of user having exclusive access to the second workspace 155b. Likewise, the second user 112b may be prevented from accessing the first workspace 155a if the second user 112b is not a member of the first team of users having exclusive access to the first workspace 155a.

The first workspace 155a, the second workspace 155b, and the third workspace 155c may use one or more modules from the module registry 145. The module registry 145 may be a database that stores the one or more modules. Each module may be rendered in a configuration language and may provide a framework for managing related resources, such as resources from the same provider, that can be used by a variety of workspaces. For example, one module may be specialized for provisioning and deprovisioning servers via Amazon Web Services. In some embodiments, modules may be provided by a third party. For example, a resource provider may create a module for managing their resource or related resources. In other embodiments, modules may be provided by the IT infrastructure controller. For example, the IT infrastructure controller may create modules for resources that are commonly used by users. In other embodiments, modules may be provided by users, such as user 112a and user 112b. For example, user 112a may create a module based on resources that are frequently used. The IT infrastructure controller may manage updates to modules in the module registry 145.

The IT infrastructure controller 140 may generate, based at least on the configurations associated with the first workspace 155a, the second workspace 155b, and/or the third workspace 155c, the execution plan 160. Generating an execution plan may also be referred to as planning a run on the first workspace 155a, the second workspace 155b, and/or the third workspace 155c. The execution plan 160 may include one or more operations to provision, modify, and/or de-provision resources at the information technology infrastructure 130 in order to apply, to the information technology infrastructure 130, the configurations associated with the first workspace 155a, the second workspace 155b, and/or the third workspace 155c. In some embodiments, the first workspace 155a, the second workspace 155b, and/or the third workspace 155c may include a reference to one or more modules in the module registry 145. Then, when generating the execution plan, the IT infrastructure controller 140 may retrieve the module from the module registry 145 and determine operations associated with the module.

The IT infrastructure controller 140 may apply, to the information technology infrastructure 130, the configurations associated with the first workspace 155a, the second workspace 155b, and/or the third workspace 155c by at least performing the operations included in the execution plan 160, for example, to provision, modify, and/or deprovision one or more resources at the information technology infrastructure 130. The process of applying the configurations of an execution plan may be referred to as executing a run. According to some example embodiments, the IT infrastructure controller 140 may be configured to implement the execution plan 160 based at least on the execution plan 160 having been successfully validated by the validation engine 170. The validation engine 170 may be configured to provide an indication of the execution plan 160 as having been successfully or unsuccessfully validated by the validation engine 170. Alternatively and/or additionally, the validation engine 170 may provide an indication of the execution plan 160 as having passed or failed each of the first policy 175a, the second policy 175b, the first quota 175c, the second quota 175d, and/or the like.

Referring again to FIG. 2, the state controller 180 may also maintain a run log 187 tracking, for example, various runs of one or more execution plans including, for example, the execution plan 160. As used herein, "running" the execution plan 160 may include generating the execution plan 160, validating the execution plan 160, applying the configurations associated with the execution plan 160, canceling the execution plan 160, discarding the execution plan 160, and/or the like. Accordingly, each run of an execution plan may be associated with a run status including, for example, planning, planned, error, confirmed, applying, applied, executed, canceled, discarded, pending, policy checking, policy checked, policy override, and/or the like. The run log 187 may be configured to track the runs of one or more execution plan including, for example, by storing a corresponding run status for each of the runs.

In some example embodiments, the state controller 180 may maintain state files and run logs for each individual workspace. For example, the first state file 185a, the second state file 185b, and the run log 187 may be associated with the first workspace 155a while the state controller 180 may maintain additional state files and run logs for the other workspaces including, for example, the second workspace 155b, the third workspace 155c, and/or the like. However, it should be appreciated that the first state file 185a, the second state file 185b, and the run log 187 may be associated with the information technology infrastructure 130 as a whole instead of any individual workspace associated with the information technology infrastructure 130.

Figure 3:
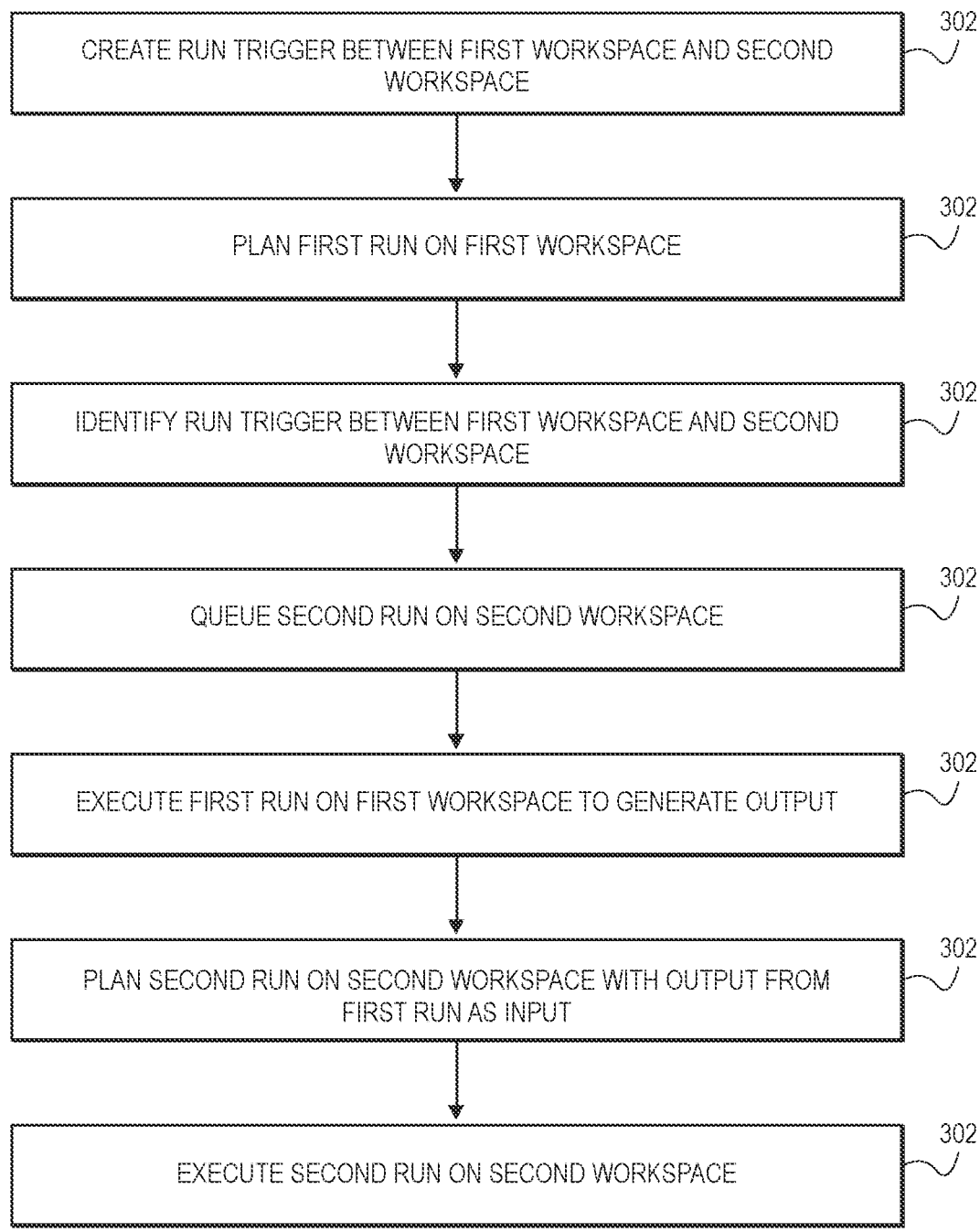
FIG. 3 depicts a flowchart illustrating a process for managing IT infrastructure with run triggers, in accordance with some example embodiments.

FIG. 3 depicts a flowchart illustrating a process of managing the IT infrastructure, in accordance with some example embodiments. The process may be performed by the IT infrastructure controller to manage an IT infrastructure.

In step 302, a run trigger can be created between a first node and a second node. The run trigger may be initiated and cause some action (e.g., a run on the second node) in response to an action at the first node (e.g., a run on the first node, a modification of the first node). In some embodiments, the first node may be a workspace or a module. In embodiments, the second node may be a workspace. When editing a configuration file for the first node, a user may establish a run trigger between the first node and the second node. The user can use a command to specify that the second node is dependent on the first node. Alternatively, the user may establish a run trigger between the first node and the second node when editing a configuration file for the second node. The user can then use a command to list the first node as upstream of the second node. In some embodiments, the first node may be a module that is used in the second node. The run trigger may comprise a source identifier and a destination identifier. The source identifier may be an identifier of the first node and the destination identifier may be an identifier of the second node. The run trigger may also include a source type, indicating the type of the first node (e.g., workspace, module). The run trigger may then be stored. In some embodiments, the run trigger may be stored in a run trigger database of the IT infrastructure controller. Prior to creating the run trigger, the IT infrastructure controller can determine that the run trigger does not form a loop. More details regarding detecting loops are described with reference to FIG. 4. In some embodiments, there may be limits on the number of run triggers that may be assigned, for source nodes and/or destination node. For example, the second node may be limited to 20 upstream run triggers. As another example, the first node may be limited to 250 downstream run triggers.

In step 304, a first run can be planned on a first node, if the first node is a first workspace. The first node can maintain configuration for a first portion of the cloud computing infrastructure associated with at least a first portion of a cloud-based application on the cloud computing infrastructure. For example, the first portion of the cloud computing infrastructure may include network hardware. The first run can include a first process executed on the first portion of the cloud computing infrastructure with data at least temporarily stored on the first node. In the planning phase, the IT infrastructure controller can do the planning phase and review the configuration file. When planning the run, the IT infrastructure controller may assign a run source identifier to the first run. For example, the run source identifier may be a unique alphanumeric string. Planning the first run may be the action that initiates the run trigger identified in step 302.

In step 306, the run trigger can be identified between the first node and a second node. The second node can maintain configuration for a second portion of the cloud computing infrastructure associated with executing at least a second portion of the cloud-based application on the cloud computing infrastructure. For example, the second portion of the cloud computing infrastructure may include security hardware. In some embodiments, in order to identify the run trigger, the IT infrastructure controller may use the source identifier to query the run trigger database. The run trigger database can then return the destination identifier to the IT infrastructure controller. Once the IT infrastructure controller has received the destination identifier, it can locate the second node.

In step 308, the IT infrastructure controller can queue a second run on the second node based on the run trigger. The second run can be a second process executed on the second portion of the cloud computing infrastructure with data received and at least temporarily stored by the second node. In queueing the second run on the second node, the IT infrastructure controller can establish a run, but the run may not move towards the plan phase until a later time. The second run may be queued with a run source identifier. In embodiments, the second run may have the same run source identifier as the run that initiated the run trigger, which in this example may be the identifier of the first run. This may indicate that the first run and the second run originated from the same source.

In step 310, the first run can be executed on the first node, wherein the first run causes the cloud computing infrastructure to modify one or more infrastructure resources associated with the first portion of the cloud computing infrastructure. For example, the first run can cause the addition of a plurality of cloud computing servers to the network hardware. The first run can then generate a state file. The state file may include a listing of the cloud based infrastructure in use by the cloud-based application at the end of the first run. In some embodiments, the state file can be stored in a database accessible by other nodes. In some embodiments, the database may be part of the cloud computing infrastructure.

In step 312, the second run can be planned on the second node. In some embodiments, the state file generated by the first run may be an input to the second run. The second node may retrieve the state file in order to use it as inputs. The state file may be retrieved from the database. In some embodiments, the second node may retrieve it from the first client accessing the first node. The state file may provide the values for the workspace that is the second node. The configuration file of the second node can go through the planning phase with the inputs from the state file. Some or all of the state file may be used as some or all of the input values to the second node.

In step 314, the second run can be executed on the second node, based on the run trigger. The second run can cause the cloud computing infrastructure to modify one or more other infrastructure resources associated with the second portion of the cloud computing infrastructure. For example, the second run can cause the deprovisioning of one or more database associated with security hardware. When the second run is executed, the IT infrastructure controller may determine that the run trigger did not create a loop. In some embodiments, users may be able to add run triggers between the steps of queueing the second run and executing the second run. Therefore, though a loop may not have existed prior to the second run being queued, a loop may exist at runtime. If there is a loop, the IT infrastructure controller may abort the second run before execution. The IT infrastructure controller may also display an error message indicating that a loop was detected. More details regarding detecting loops as described below with reference to FIG. 4.

In some embodiments, input from a user may be required to begin execution of a run, such as between steps 312 and 314. At this time, the user may review the run plan and make any desired modifications before executing the run. This may also provide the user with an opportunity to detect loops. In some embodiments, the IT infrastructure controller may "auto-apply" the plan stage and begin executing the run without input from a user.

In some embodiments, the process of FIG. 3 may be different if the first node is a module. A module may be part of a workspace and therefore a run may not be planned or executed on the module directly. For example, the first node may be a module and the second node may be a workspace that incorporates the module. In some embodiments, in order to incorporate the module, the workspace may include a call or reference to the module. The module may be one of a plurality of modules in a module registry.

After the run trigger is assigned between the first node and the second node, the first node may be modified. For example, a user or third-party may update a module to fix a bug or security weakness. When an updated module is submitted to the IT infrastructure controller, the IT infrastructure controller may identify the run trigger between the first node and the second node, as in step 306, and queue a run on the second node, as in step 308. The modification of the module may be the action that initiates the run trigger created in step 302. The run may then be planned and executed on the second node, as in steps 312 and 314. In this embodiment, the run on the second node may be assigned a unique run source identifier, instead of taking the run source identifier of a previous run.

In some embodiments, run triggers may be created automatically by the IT infrastructure controller. The IT infrastructure controller may know the configuration of nodes and their upstream/downstream relationships. The IT infrastructure controller can parse the structure of a node and automatically detect an upstream node. For example, the IT infrastructure controller may detect that a workspace has as an input configuration values that depend on a different workspace, and thus that workspace may be considered to be an upstream node. As another example, the IT infrastructure controller may identify that a workspace uses a module, and thus the module may be considered to be an upstream node. Once an upstream node is detected, the IT infrastructure controller may then create a run trigger between the node and the detected upstream node. In some embodiments, the IT infrastructure controller may present a user creating or modifying a workspace with a list of detected upstream nodes. The user may then select the nodes that they would like to connect to with a run trigger. In other embodiments, the IT infrastructure controller may create run triggers between nodes automatically without user input.

Figure 4:
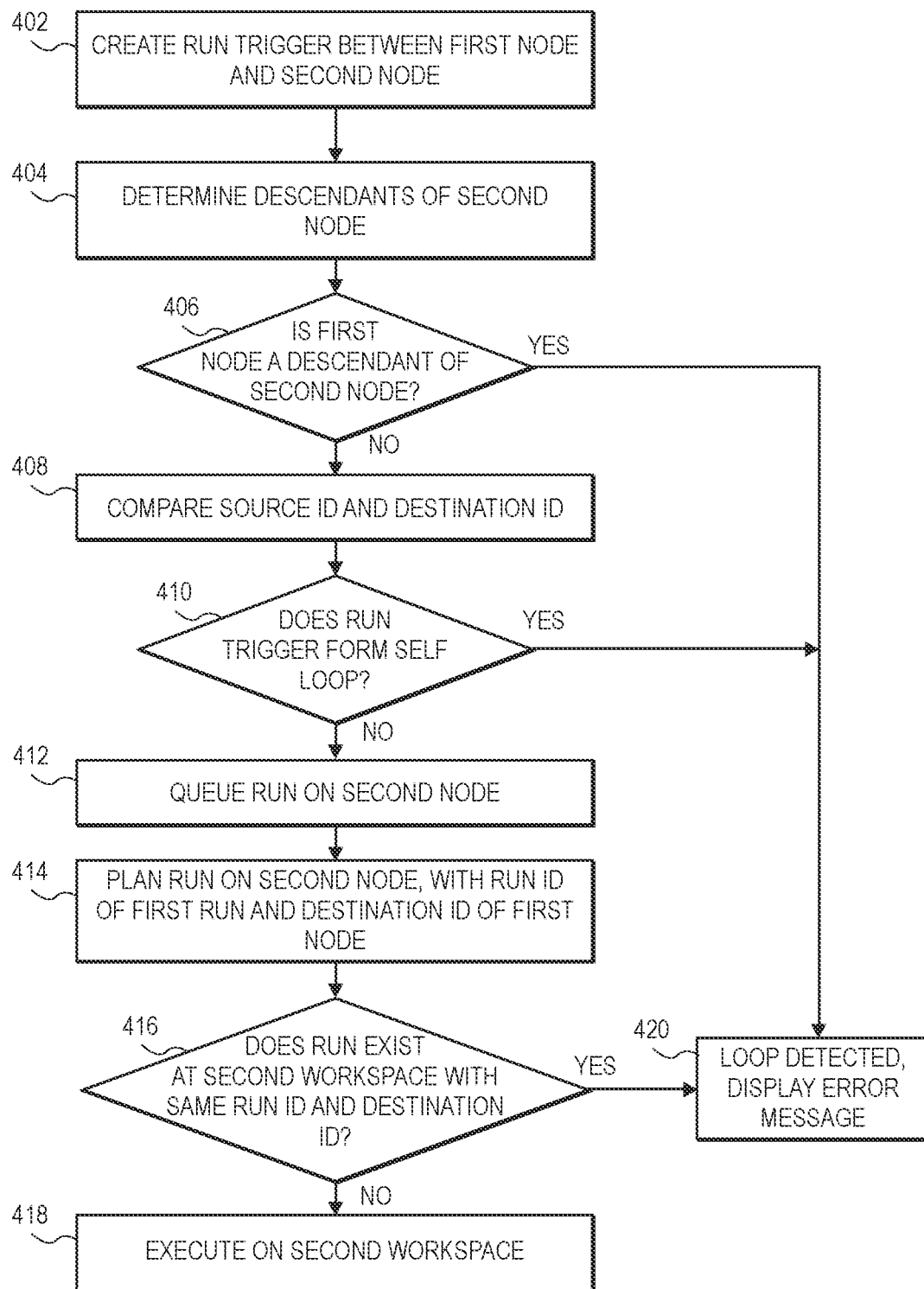
FIG. 4 depicts a flowchart illustrating a process of identifying run trigger loops, in accordance with some example embodiments.

FIG. 4 is a flowchart illustrating loop detection according to embodiments. In some embodiments, the process of FIG. 4 may be performed by an IT infrastructure controller, such as IT infrastructure controller 140 of FIG. 1. Loop detection as described below may occur at multiple points over the lifecycle of a run trigger. For example, steps 402-410 may describe a process for identifying loops when a run trigger is first created. Step 412 may describe the process of planning a run based on the run trigger, and steps 414-418 may describe a process for identifying loops while the run is planned and/or executed.

In step 402, a run trigger may be created between a first node and a second node. For example, a user of a client may attempt to create a run trigger linking a first workspace to a second workspace. In some embodiments, the first node may be a module or a workspace. The second node may be a workspace. The run trigger may include a source identifier, which is an identifier of the first node, and a destination identifier, which is an identifier of the second node. The run trigger may also include a source type, indicating the type of the first node (e.g., workspace, module). Before creating the run trigger, the IT infrastructure controller may seek to determine whether the proposed run trigger forms a loop. Step 402 may be substantially similar to step 302 of FIG. 3.

In step 404, descendants of the second node can be determined. The descendants of a first node may be all nodes that are connected to the first node by one or more run triggers that identify the first node as a source, and all descendants of those nodes. For example, the second node may have two run triggers, one between the second node and a third node, and one between it and a fourth node. The fourth node may also have a run trigger between it and a fifth node. Thus the third node, the fourth node, and the fifth node may all be descendants of the second node. In some embodiments, the IT infrastructure controller may determine descendants of a node by querying a run trigger database. As an example, the IT infrastructure controller may query the run trigger database for any run triggers that have the second node as a source node. The IT infrastructure controller may then use the results to iteratively search for other nodes that have those nodes as sources.

In step 406, the IT infrastructure controller can determine if the first node is a descendant of the second node. If the first node is a descendant of the second node, then the run trigger between the first node and the second node forms a loop, and the IT infrastructure controller can go to step 420. If the first node is not a descendant of the second node, the IT infrastructure controller can go to step 408.

In step 408, the IT infrastructure controller can compare the source identifier and the workspace identifier of the run trigger. The source identifier may be the identifier of the node that initiated the run trigger and the destination identifier may be the identifier of the workspace (or other node) being triggered by the run trigger.

In step 410, the IT infrastructure controller can determine if the run trigger forms a self-loop. If the source identifier and the destination identifier are the same, then the first node is the second node and a self-loop has been formed. The IT infrastructure controller may then go to step 420. If the source identifier and the destination identifier are different, then no self-loop is formed and the IT infrastructure controller may go to step 414.

In step 412, the IT infrastructure controller may queue the run on the second node. Step 412 may be substantially similar to step 308 of FIG. 3.

In step 414, the IT infrastructure controller can plan the run on the second node. In some embodiments, the run may be triggered in response to a first run at the first node (e.g., if the first node is a workspace). Then the run may be a second run and may comprise the run source identifier of the first run on the first node, and have a workspace identifier of the first node. Thus after a run is manually initiated (e.g., at the first node), all subsequent runs that are initiated from run triggers based on that that run may have the same run source identifier and the same workspace identifier. In other embodiments, the run may be triggered in response to a modification of the first node (e.g., if the first node is a module). Then the IT infrastructure controller may generate a unique run source identifier for the run. Subsequent runs that are triggered from this run may then use the same run source identifier. Step 414 may be substantially similar to step 312 of FIG. 3.

In step 416, the IT infrastructure controller, before or while executing the run on the second node, can determine if another run is already queued or planned at the second node, with the same run source identifier and the same destination identifier. If a run already exists at the second node with the same identifiers, this may indicate that the run has traversed a loop and returned to the first node where it originated. Even if no loops were detected during the planning phase of the run, a new run trigger may have been created after the second run was planned but before it was executed. If a run with the same identifiers exists, the IT infrastructure controller can go to step 420. If not, the IT infrastructure controller can go to step 418.

In step 418, the IT infrastructure controller can execute the run on the second node. Step 418 may be substantially similar to step 314 of FIG. 3.

In step 420, after a loop has been detected, the IT infrastructure controller can abort the run. The IT infrastructure controller may also display an error message to client computers associated with the first node and/or the second node. In some embodiments, the error message may describe that the run was aborted because a loop was detected. The error message may also describe the type of loop that was detected (e.g., a loop, a self-loop).

Figure 5B:
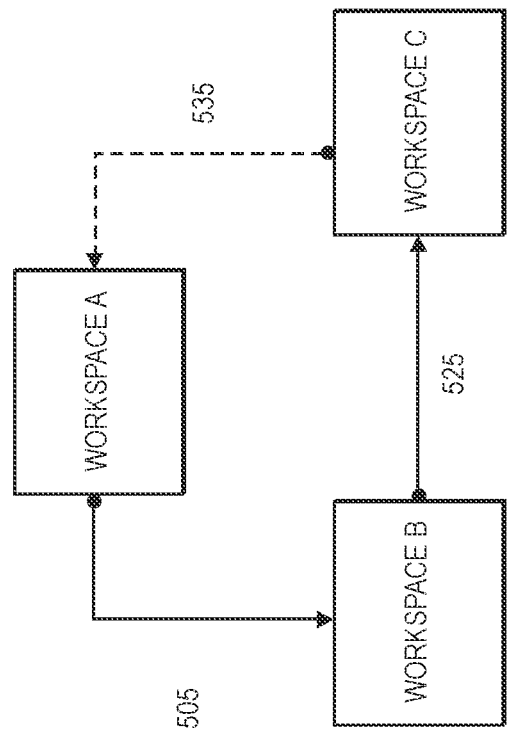
FIG. 5A and FIG. 5B depicts an example node dependency graph, in accordance with some example embodiments.
Figure 5A:
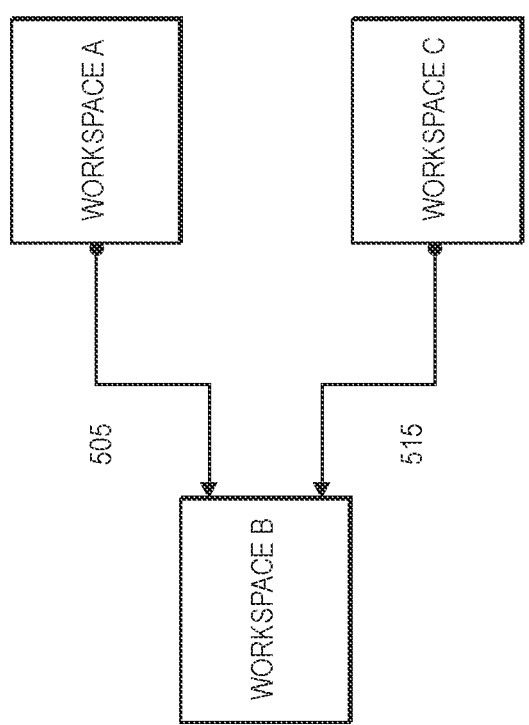

FIG. 5A and FIG. 5B are example directed graphs illustrating run triggers between nodes. In these examples, the nodes may be workspaces. In other examples, one or more source nodes may be modules.

FIG. 5A shows three workspaces, workspace A, workspace B, and workspace C. Workspace A and workspace C may both be source nodes. Run trigger 505 may connect workspace A and workspace B, while run trigger 515 may connect workspace C and workspace B. Therefore, whenever a run is executed on workspace A, a run may be triggered on workspace B. Similarly, when a run is executed on workspace C, a run may be triggered on workspace B. In some cases, multiple runs may be queued on workspace B from workspace A and/or workspace C before the runs are executed on workspace B.

FIG. 5B shows a similar graph to FIG. 5A, with workspace A, workspace B, and workspace C. In this example, run trigger 525 may connect workspace B to workspace C. A new run trigger 535 may be proposed, connecting workspace C to workspace A. Prior to assigning the run trigger, the IT infrastructure controller may determine if run trigger 535 will result in a loop. The run trigger may have a source identifier of workspace C, and a destination identifier of workspace A. The IT infrastructure controller may then determine identifiers for the descendants of workspace A. Run trigger 505 connects workspace A and workspace B, so workspace B is a descendant of workspace A. Run trigger 525 connects workspace B to workspace C, so workspace C is also a descendant of workspace A. Thus the first workspace of the proposed run trigger 535, workspace C, is a descendant of the second workspace of the proposed run trigger 535, workspace A, and the proposed run trigger 535 forms a loop. Once the loop has been detected, the IT infrastructure controller may reject the proposed run trigger 535.

Figure 6:
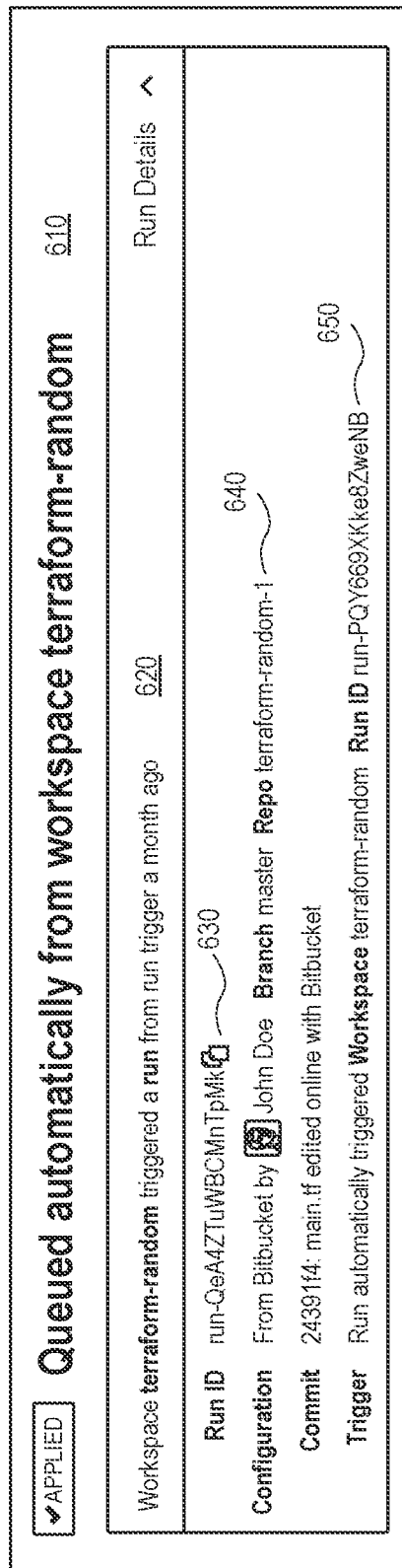
FIG. 6 depicts an example of a user interface with a queued run from a run trigger, in accordance with some example embodiments.

FIG. 6 illustrates an example user interface for displaying a queued run that was initiated by a run trigger. The user interface may display the name of the node that initiated the run (610), e.g. the workspace "terraform-random." The user interface may also display when the run was triggered (620), e.g., "a month ago." The user interface may also display information such as the run identifier of the triggered run (630), data about the configuration file that will be run with the triggered run (640), and versioning information such as a commit identifier. The user interface may also display a run source identifier for the triggered run (650).

FIG. 7 illustrates a user interface for displaying the planning phase of a run that was initiated by a run trigger. The user interface can show when the run was planned (710), including when the planning phase started and ended. The user interface may also present a link to access a raw output log of from the run plan. The user interface may display a summary of changes that will be made to the cloud computing infrastructure (720). In this example, the run may result in a resource being added to the cloud computing infrastructure and a resource being deleted. Some parameters may be listed with the values that will be applied, while other parameters may be listed with temporary values until the run is applied. The user interface may also list the workspaces that are connected to the current node by run triggers (730) and thus will have runs queued. In this example, the workspaces that will be triggered are "terraform-multi-random", "terraform-random-integer", and "terraform-random-pet."

Figure 8:
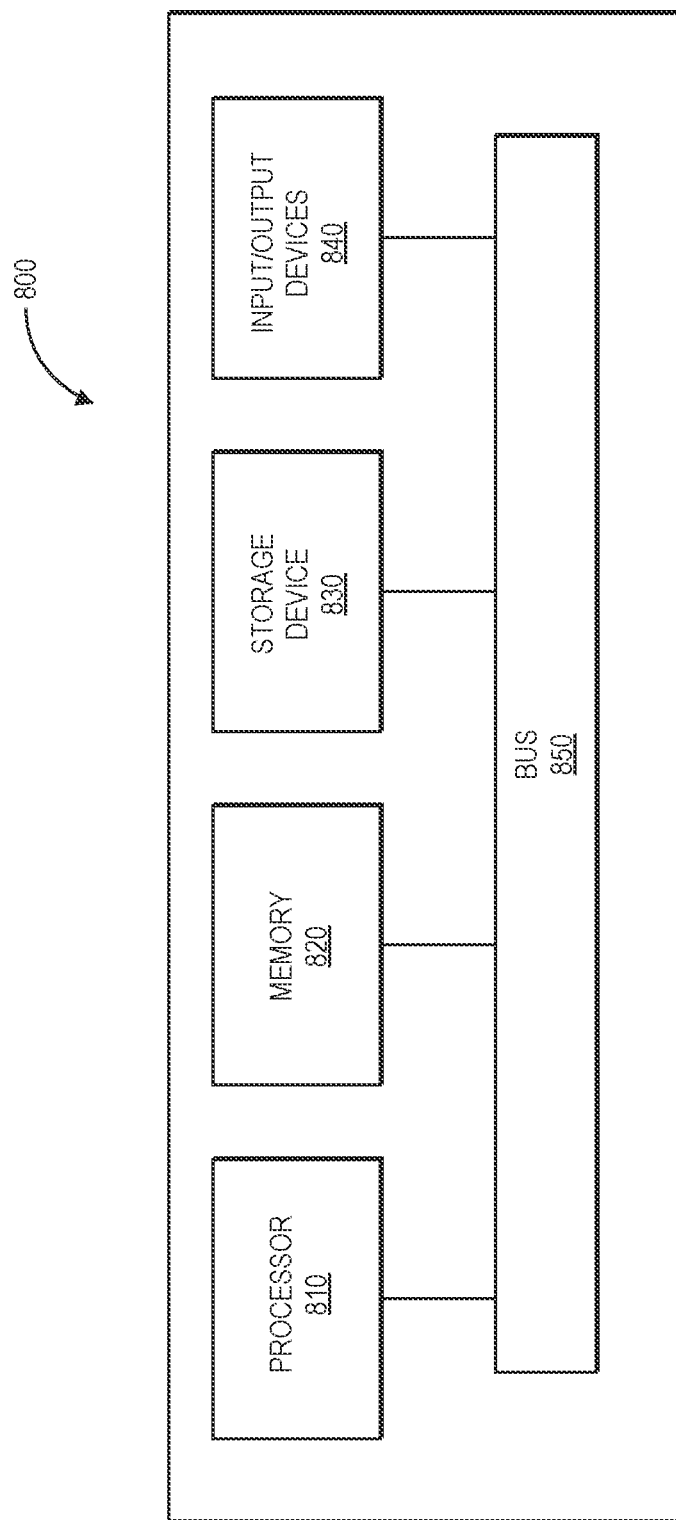
FIG. 8 depicts a block diagram illustrating a computing system consistent with implementations of the current subject matter.

FIG. 8 depicts a block diagram illustrating a computing system 800 consistent with implementations of the current subject matter. Referring to FIGS. 1-2 and 8, the computing system 800 can be used to implement the information technology infrastructure controller 140 and/or any components therein.

As shown in FIG. 8, the computing system 800 can include a processor 810, a memory 820, a storage device 830, and input/output device 840. The processor 810, the memory 820, the storage device 830, and the input/output device 840 can be interconnected via a system bus 850. The processor 810 is capable of processing instructions for execution within the computing system 800. Such executed instructions can implement one or more components of, for example, the information technology infrastructure controller 140. In some implementations of the current subject matter, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a floppy disk device, a hard disk device, an optical disk device, a tape device, a solid state device, and/or any other suitable persistent storage means. The input/output device 840 provides input/output operations for the computing system 800. In some implementations of the current subject matter, the input/output device 840 includes a keyboard and/or pointing device. In various implementations, the input/output device 840 includes a display unit for displaying graphical user interfaces.

According to some implementations of the current subject matter, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some implementations of the current subject matter, the computing system 800 can be used to execute various interactive computer software applications that can be used for organization, analysis and/or storage of data in various (e.g., tabular) format (e.g., Microsoft Excel®, and/or any other type of software). Alternatively, the computing system 800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include users and servers. A user and server are generally remote from each other and typically interact through a communication network. The relationship of user and server arises by virtue of computer programs running on the respective computers and having a user-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A computer-implemented method comprising:

identifying a run trigger between a first node and a second node, the first node maintaining configuration for a first portion of a cloud computing infrastructure associated with executing a first portion of a cloud-based application on the cloud computing infrastructure, the second node maintaining configuration for a second portion of the cloud computing infrastructure associated with executing a second portion of the cloud-based application on the cloud computing infrastructure, the run trigger initiating in response to an action at the first node and comprising a source identifier and a destination identifier, wherein the source identifier is an identifier of the first node and the destination identifier is an identifier of the second node;

planning a first run on the first node, the first run including a first process executed on the first portion of the cloud computing infrastructure with data at least temporarily stored on the first node and associated with the source identifier, wherein the first run comprises the action;

queuing a second run on the second node based on the run trigger, the second run including a second process executed on the second portion of the cloud computing infrastructure with data received and at least temporarily stored by the second node and associated with the source identifier; and executing the first run on the first node, wherein the first run causes the cloud computing infrastructure to modify one or more infrastructure resources associated with the first portion of the cloud computing infrastructure, the first run generating a state file that is an input to the second run, the state file listing the one or more infrastructure resources in use after the first run.

2. The method of claim 1, further comprising:

planning the second run on the second node; and executing the second run on the second node, wherein the second run causes the cloud computing infrastructure to modify one or more infrastructure resources associated with the second portion of the cloud computing infrastructure.

3. The method of claim 2, wherein executing the second run on the second node further comprises:
identifying one or more additional runs on the second node, each of the one or more additional runs being associated with an additional run source identifier;
comparing the run source identifier of the run to the additional run source identifiers; and
aborting the run if the run source identifier matches at least one of the additional run source identifiers.

4. The method of claim 1, wherein the first node is a workspace, and the process is a second process.

5. The method of claim 1, wherein the first node is a module, and wherein the method further comprises:
before identifying the run trigger, modifying the first node in a module registry, the module registry comprising a database of a plurality of modules, wherein the modification comprises the action.

6. The method of claim 1, wherein before identifying the run trigger, the method further comprises:
creating the run trigger between the first node and the second node.

7. The method of claim 6, wherein creating the run trigger further comprises:
determining that the run trigger does not form a loop.

8. The method of claim 7, wherein determining that the run trigger does not form a loop comprises:
identifying one or more descendants of the second node, wherein each descendant of the one or more descendants is a node connected by a subsequent run trigger to the second node or a descendant of the second node; and
determining that the identifiers of the one or more descendants of the second node do not include the identifier of the first node.

9. The method of claim 1, wherein identifying the run trigger comprises:
querying a run trigger database with the source identifier; and
receiving the destination identifier from the run trigger database.

10. The method of claim 1, wherein the second node is a workspace.

11. A system comprising:
at least one data processor; and
at least one memory storing instructions which, when executed by the at least one data processor, result in operations comprising:
identifying a run trigger between a first node and a second node, the first node maintaining configuration for a first portion of a cloud computing infrastructure associated with executing a first portion of a cloud-based application on the cloud computing infrastructure, the second node maintaining configuration for a second portion of the cloud computing infrastructure associated with executing a second portion of the cloud-based application on the cloud computing infrastructure, the run trigger initiating in response to an action at the first node and comprising a source identifier and a destination identifier, wherein the source identifier is an identifier of the first node and the destination identifier is an identifier of the second node;
planning a first run on the first node, the first run including a first process executed on the first portion of the cloud computing infrastructure with data at least temporarily stored on the first node and associated with the source identifier, wherein the first run comprises the action;
queuing a second run on the second node based on the run trigger, the second run including a second process executed on the second portion of the cloud computing infrastructure with data received and at least temporarily stored by the second node and associated with the source identifier; and
executing the first run on the first node, wherein the first run causes the cloud computing infrastructure to modify one or more infrastructure resources associated with the first portion of the cloud computing infrastructure, the first run generating a state file that is an input to the second run, the state file listing the one or more infrastructure resources in use after the first run.

12. The system of claim 11, wherein the operations further comprise:
planning the second run on the second node; and
executing the second run on the second node, wherein the second run causes the cloud computing infrastructure to modify one or more infrastructure resources associated with the second portion of the cloud computing infrastructure.

13. The system of claim 11, wherein the first node is a module, and wherein the operations further comprise:
before identifying the run trigger, modifying the first node in a module registry, the module registry comprising a database of a plurality of modules, wherein the modification comprises the action.

14. The system of claim 11, wherein before identifying the run trigger, the operations further comprise:
creating the run trigger between the first node and the second node.

15. The system of claim 14, wherein creating the run trigger further comprises:
determining that the run trigger does not form a loop.

16. The system of claim 15, wherein determining that the run trigger does not form a loop comprises:
identifying one or more descendants of the second node, wherein each descendant of the one or more descendants is a node connected by a subsequent run trigger to the second node or a descendant of the second node; and
determining that the identifiers of the one or more descendants of the second node do not include the identifier of the first node.

17. The system of claim 11, wherein executing the run on the second node further comprises:
identifying one or more additional runs on the second node, each of the one or more additional runs associated with an additional run source identifier;
comparing the run source identifier of the run to the additional run source identifiers; and
aborting the run if the run source identifier matches at least one of the additional run source identifiers.

18. The system of claim 11, wherein identifying the run trigger comprises:
querying a run trigger database with the source identifier; and
receiving the destination identifier from the run trigger database.

19. The system of claim 11, wherein the second node is a workspace.

20. A non-transitory computer-readable storage medium storing instructions, which when executed by at least one data processor, result in operations comprising:

identifying a run trigger between a first node and a second node, the first node maintaining configuration for a first portion of a cloud computing infrastructure associated with executing a first portion of a cloud-based application on the cloud computing infrastructure, the second node maintaining configuration for a second portion of the cloud computing infrastructure associated with executing a second portion of the cloud-based application on the cloud computing infrastructure, the run trigger initiating in response to an action at the first node and comprising a source identifier and a destination identifier, wherein the source identifier is an identifier of the first node and the destination identifier is an identifier of the second node;

planning a first run on the first node, the first run including a first process executed on the first portion of the cloud computing infrastructure with data at least temporarily stored on the first node and associated with the source identifier, wherein the first run comprises the action;

queuing a second run on the second node based on the run trigger, the second run including a second process executed on the second portion of the cloud computing infrastructure with data received and at least temporarily stored by the second node and associated with the source identifier; and executing the first run on the first node, wherein the first run causes the cloud computing infrastructure to modify one or more infrastructure resources associated with the first portion of the cloud computing infrastructure, the first run generating a state file that is an input to the second run, the state file listing the one or more infrastructure resources in use after the first run.

* * * * *